(12) United States Patent
Hyde et al.

(10) Patent No.: US 8,897,840 B1
(45) Date of Patent: Nov. 25, 2014

(54) GENERATING A WIRELESS DEVICE RINGTONE

(75) Inventors: Caleb Hyde, Kansas, MO (US); Clark Halferty, Lees Summit, MO (US); Rajveen Narendran, Olathe, KS (US); Andrew Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 796 days.

(21) Appl. No.: 13/109,279

(22) Filed: May 17, 2011

(51) Int. Cl.
*H04M 1/00* (2006.01)

(52) U.S. Cl.
USPC ............ 455/567; 455/62; 455/63.1; 381/101; 381/61

(58) Field of Classification Search
USPC ............. 381/98, 101–103, 61, 316, 312, 320; 704/260, 225, 271, 503; 455/90.1, 455/550.1, 39, 567, 62, 63.1; 379/179
See application file for complete search history.

(56) References Cited

U.S. PATENT DOCUMENTS

| | | |
|---|---|---|
| 2006/0120549 A1 | 6/2006 | Burghardt |
| 2008/0130867 A1 | 6/2008 | Bowen |
| 2008/0254753 A1 * | 10/2008 | Steenstra et al. ............. 455/90.1 |
| 2010/0094619 A1 | 4/2010 | Hubner et al. |

* cited by examiner

*Primary Examiner* — Vivian Chin
*Assistant Examiner* — Friedrich W Fahnert

(57) ABSTRACT

A plurality of frequencies are generated at a wireless device and a frequency which a user perceives as the loudest frequency is determined. A first frequency range is selected comprising a first minimum frequency and a first maximum frequency. A ringtone is processed to shift the second frequency range to within the first frequency range, wherein an average frequency of the processed ringtone is the determined loudest frequency.

8 Claims, 6 Drawing Sheets

GENERATING A WIRELESS DEVICE RINGTONE

TECHNICAL BACKGROUND

The use of wireless devices is widespread. A wireless device can include a wide range of portable devices such as portable computing platforms, including tablet, palmtop, laptop, and other form factors, as well as cell phones, smart phones, and other devices capable of wireless communication. Wireless devices often signal a user with an audio signal to provide information to a user or to capture a user's attention. For example, a cell phone or smart phone may signal an incoming call to a user with an audio signal often referred to as a ringtone. When a user hears the ringtone, the user can act based on the signal (for example, answering the call, directing the call to voice mail, or ignoring the call but noting the time of the call and/or the identity of the caller). Notifications of received messages such as email or text messages, or of event notifications such as calendar events, can be similarly provided to a user with an audio signal.

A person's ability to hear certain frequencies can be diminished for many reasons. For example, as people age the ability to hear higher frequencies typically diminishes. Injury and illness can also reduce one's ability to hear certain frequencies. People with diminished hearing may have difficulty hearing a ringtone or other similar audio signal from a wireless device, which can degrade their ability to use the wireless device and diminish the user experience due to missed audio notifications.

Overview

In one embodiment, a plurality of frequencies are generated at a wireless device, and a frequency which a user perceives as the loudest frequency is determined from among the plurality of frequencies. A first frequency range comprising a first minimum frequency and a first maximum frequency is selected based on the determined frequency. When a ringtone which is in a second frequency is received at the wireless device, the second ringtone is processed to shift the second frequency range to within the first frequency range, wherein an average frequency of the processed ringtone is the determined loudest frequency.

DETAILED DESCRIPTION

In an embodiment, a plurality of frequencies are generated at the wireless device, and from among the plurality of frequencies, a frequency which a user perceives as the loudest frequency is determined. Based on the determined frequency, a first frequency range is selected comprising a first minimum frequency and a first maximum frequency. A ringtone which is in a second frequency is received at the wireless device, and the second ringtone is processed to shift the second frequency range to within the first frequency range, wherein an average frequency of the processed ringtone is the determined loudest frequency.

Figure 1:
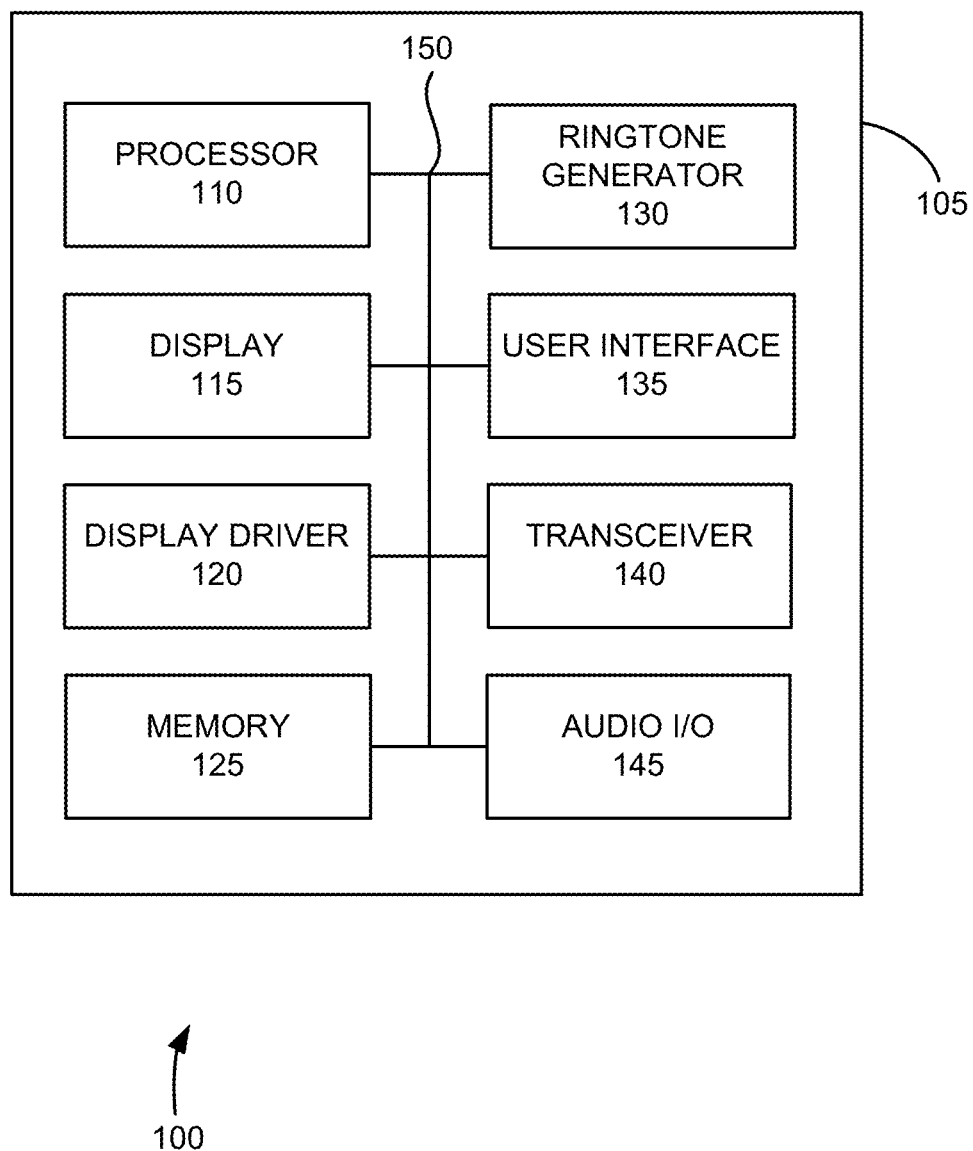
FIG. 1 illustrates an exemplary wireless device.

FIG. 1 illustrates an exemplary wireless device 100 comprising a processor 110, a display 115, a display driver 120, a memory 125, a ringtone generator 130, a user interface 135, a transceiver 140, and an audio input/output device 145. Display 115 can display information, and can be coupled with user interface 135 to receive input, such as by a touch screen or similar device. Display driver 120 controls the display of information on the display 115. Memory 125 can store data, and for example comprises a disk drive, a flash drive, a solid state memory device, memory circuitry, or some other memory device, in various forms of volatile and non-volatile memory storage. Memory 125 can store software comprising for example computer programs, firmware, or some other form of machine-readable instructions, and may include an operating system, utilities, drivers, network interfaces, applications, or some other type of software.

The wireless device 100 also includes a transceiver 140 which enables the device 100 to communicate wirelessly. Wireless signals for example comprise radio frequency, microwave, infrared, laser, visible light, and other similar signals. The device can also include an audio input and output, such as audio I/O 145, which can comprise a speaker to produce sound and/or a microphone to receive sound input. Processor 110 can retrieve and execute software from the memory 125, process data, and control the operation of elements 115-140.

Ringtone generator 130 is a unit which generates a signal to be output by audio I/O 145 as an audio signal. The signal can be, for example, a tone at a frequency or a series tones at the same or different frequencies. The signal can also be a sound file having a plurality of frequencies. The signal can be tonally simple or complex, and can be unitimbral or multitimbral. Ringtone generator 130 can comprise, for example, a signal synthesizer which can employ, additive or subtractive sound synthesis, FM synthesis, phase distortion synthesis, and/or sampling synthesis including granular synthesis. Ringtone generator 130 can also generate signals from encoded sound files, which can be stored in memory 125. In addition to generating signals, ringtone generator 130 can process frequencies in ringtones to shift frequencies therein, as further described below.

Elements 110-140 can communicate over communication link 150, for example a communication bus. Each of the elements 110-150 can be disposed within, for example, a housing 105, but this is by no means a requirement or limitation.

In operation, the ringtone generator 130 generates a signal with a plurality of frequencies and sends the signal to the audio I/O 145 for output to a user. The plurality of frequencies can be, for example, a sequence of discrete frequencies (for example, separated by a predetermined gap of frequencies) or it can be a continuous sweep of frequencies in a range, whether from high to low or from low to high. The range of frequencies generated can be, for example, between 20 Hz and 20,000 Hz, but the range and the specific frequencies generated can vary. A determination is made as to which frequency or frequencies a user perceives as the loudest frequency. For example, a user can provide an input to the user interface 135 and/or the display 115 if the display is configured to receive an input. In operation, the plurality of frequencies are output by the audio I/O 145 at substantially the same sound pressure level (SPL) to increase the accuracy of the determination of the loudest perceived frequency.

Based on the determined frequency or frequencies, a first frequency range is selected comprising a first minimum frequency and a first maximum frequency. For example, the first minimum and maximum frequencies can be determined based on a predetermined frequency interval, for example 500 Hz, so that the first minimum frequency will be determined to be 250 Hz lower than a determined loudest frequency, and the first maximum frequency will be determined to be 250 Hz higher than a determined loudest frequency. As another example, the first minimum and maximum frequencies can be selected by a user. For example, when the loudest frequency is determined to be 3000 Hz, the first minimum frequency of the first frequency range can be determined by providing frequencies increasingly lower than 3000 Hz, and receiving an input indicating when the perceived loudness of the frequencies meets or is below a threshold. The threshold can be a perceptual threshold indicated by the user, for example, when the frequencies can no longer be heard, or at a point where a user indicates a frequency at a perceived loudness less than that of the determined loudest frequency, but still audible to the user. Similarly, the first maximum frequency can be determined by providing frequencies increasingly lower than 3000 Hz (the perceived loudest frequency in this example) and receiving an input indicating that a perceived volume meets or is below a threshold, as described above.

When the first frequency range is determined, a ringtone is received at the wireless device. The ringtone has a second frequency range, that is, the constituent frequency or frequencies of the ringtone fall on or between a second minimum and second maximum frequency. The second frequency range may partially overlap with the first frequency range, but in operation at least a portion of the second frequency range does not overlap with the first frequency range. The ringtone can be selected from memory 125, or it can be received via transceiver 140, or received through input into the user-interface 115 or an input-enabled display 115. When the ringtone is received at the wireless device, it can be provided to the ringtone generator 130. The ringtone generator 130 processes the second ringtone to shift the second frequency range to within the first frequency range, wherein an average frequency of the processed ringtone is the determined loudest frequency. As an example, the ringtone generator 130 can analyze the ringtone and determine its constituent frequencies and frequency range. As another example, the ringtone can comprise metadata which indicate the ringtone's constituent frequencies and/or its frequency range. Based on the identified constituent frequencies of the ringtone and the determined first frequency range, the ringtone generator shifts the ringtone frequencies into the first frequency range. In an embodiment, the ringtone generator 130 can be configured to shift the frequencies proportionally to preserve a relationship among the ringtone frequencies. This is particularly important if the ringtone is a representation of music, such as a song sample or a group of frequencies forming a melody.

Figure 2:
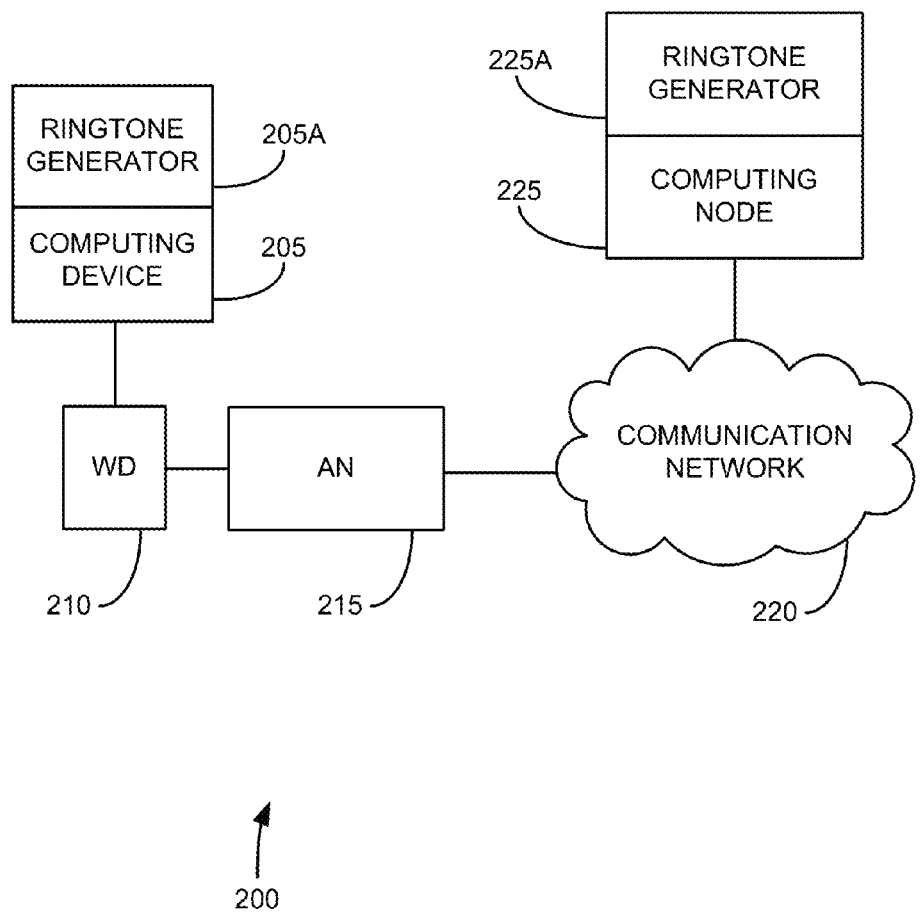
FIG. 2 illustrates an exemplary communication system.

FIG. 2 illustrates an exemplary communication system 200. Communication system 200 comprises computing device 205, wireless device 210, access network 215, communication network 220, and computing node 225. Other network elements may be present in the communication system 200 to facilitate wireless communication but are omitted for clarity, such as gateways, routers, mobile switching centers, and location registers such as a home location register or visitor location register. Other network elements may be present in the communication system 200 to facilitate wireless communication but are omitted for clarity, such as base stations, base station controllers, gateways, mobile switching centers, dispatch application processors, and location registers such as a home location register or visitor location register. Other network elements may also be present to facilitate communication between the computing node 225, the communication network 220, and the access node which are omitted for clarity, including additional processing nodes, routers, gateways, and physical and/or wireless data links for carrying data among the various network elements. Wireless device 210 can be analogous to exemplary wireless device 100 described above.

The computing device 205, the wireless device 210, the access node 215, the communication network 220, and the computing node 225 each communicate over wired or wireless communication links or combinations thereof. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, wireless fidelity (WiFi), Bluetooth, Infrared Data Association standard (IrDA), Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Computing device 205 can include a computing device of various form factors including desktop, laptop, palmtop, tablet, etc., capable of communicating with the wireless device 210. Computing device 205 can include a ringtone generator unit 205A which can generate an audio signal. The signal can be, for example, a tone at a frequency or a series tones at the same or different frequencies. The signal can also be a sound file having a plurality of frequencies. The signal can be tonally simple or complex, and can be unitimbral or multitimbral. Ringtone generator 205A can comprise, for example, a signal synthesizer and the ringtone generator can also generate signal from encoded sound files. Ringtone generator 205A can also process sound files to shift frequencies therein. The computing device 205 can include hardware or software which performs the functions of the ringtone generator 205A. In operation, a communication session can be established over a wired or wireless connection between the computing device 205 and the wireless device 210 to permit the transmission of signals with frequencies and ringtones between the ringtone generator 205A and the wireless device 210.

Access node 215 communicates with the wireless device 210 to facilitate access by the wireless device to the communication network 220, and can be for example a base transceiver station or an eNodeB device. Communication network 220 is a network or internetwork and is in communication with the access node 215.

Computing node 225 is in communication with the communication network 115, and can communicate with the wireless device 210 via the communication network 220 and the access node 215. Computing node 225 can include a ringtone generator 225A similar to the ringtone generator 205A. That is, ringtone generator 225A can generate an audio signal, can also process sound files to shift frequencies therein. The computing node 225 can include hardware or software which performs the functions of the ringtone generator 225A. In operation, a communication session can be established via the access node 215 and the communication network 220 between the computing node 225 and the wireless device 210, to permit the transmission of signals with frequencies and ringtones between the ringtone generator 225A and the wireless device 210.

Figure 3:
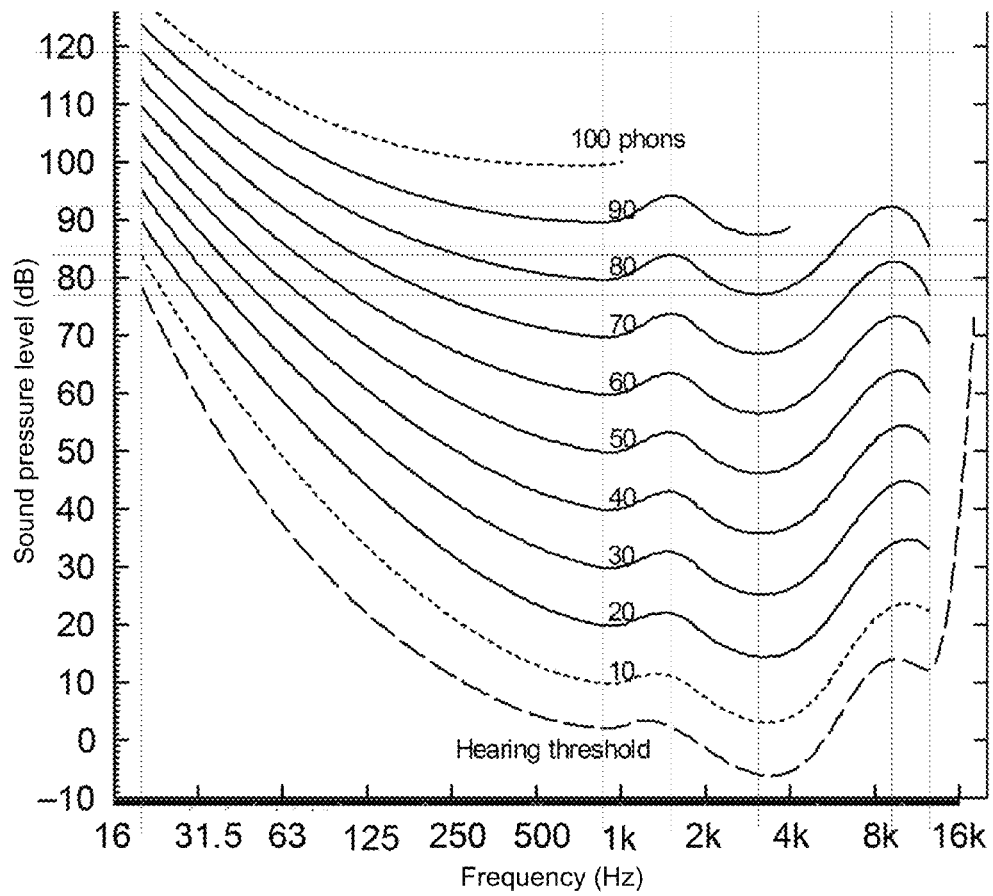
FIG. 3 illustrates an exemplary graph of human frequency perception.

FIG. 3 illustrates an exemplary graph of human frequency perception, also referred to as equal-loudness contours. Humans can hear frequencies in a range from approximately 20 Hz to approximately 20,000 Hz. However, human hearing perception varies according to both the frequency and the sound pressure level (SPL) of a sound, among other things. The SPL at which a person can perceive a given frequency can be represented in units of perceived loudness, for example, phons. The empirically determined equal-loudness contours illustrated in FIG. 3 indicate the SPLs at which frequencies are perceived to be approximately the same loudness. For example, the curve labeled 20 phons indicates that a tone at approximately 3000 Hz is perceived to be 20 phons at approximately 15 dB, while a tone at approximately 250 Hz is perceived to be 20 phons at approximately 32 dB. Perceptual sensitivity decreases markedly below 250 Hz and above 16 kHz. Many factors can affect an individual's perception of sound, among them age, congenital hearing issues, illness and injury. For example, age-related hearing loss in the high frequency range as well as varying sensitivity to frequencies across the human hearing range is common. Injury or illness can also affect the range of hearing as well as discrete frequency sensitivity.

Figure 4:
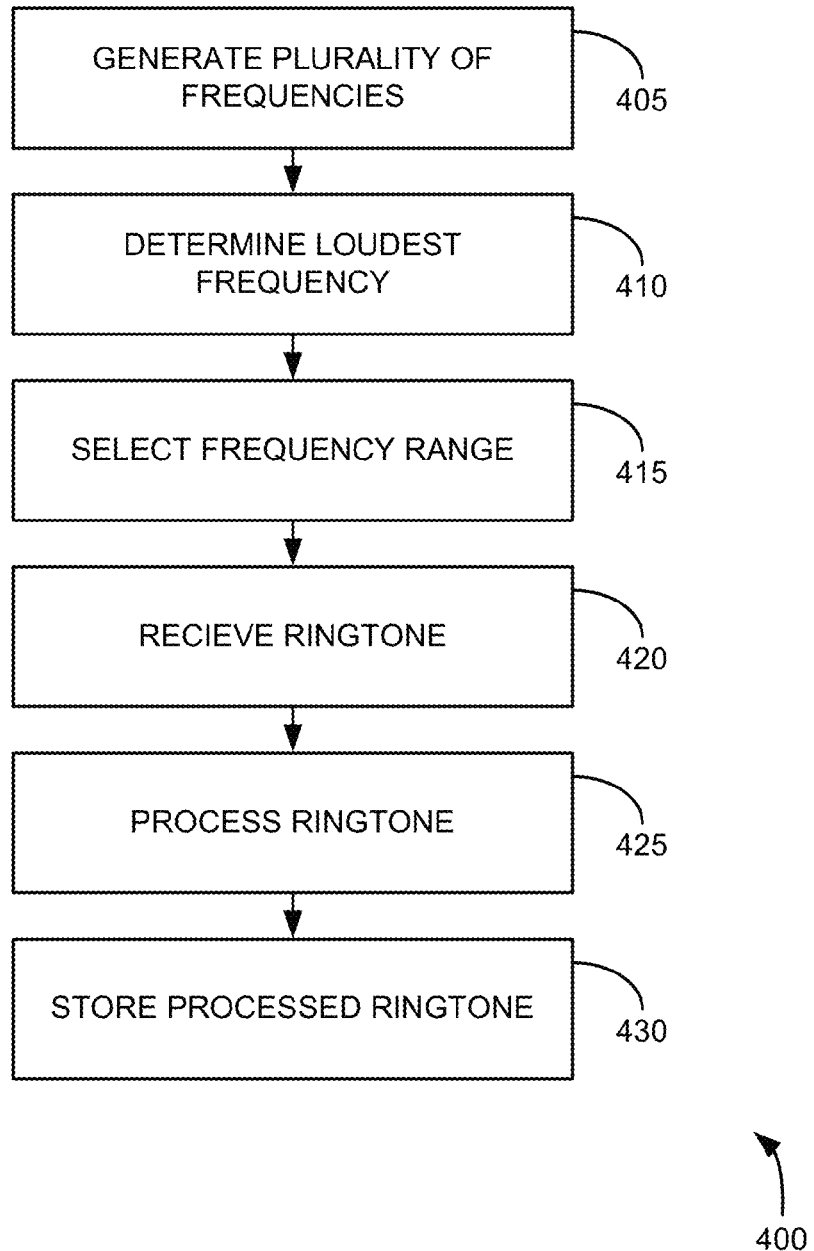
FIG. 4 illustrates an exemplary method of generating a ringtone.

FIG. 4 illustrates an exemplary method of generating a ringtone. In operation 405, a plurality of frequencies is generated and provided to a user at the wireless device. The plurality of frequencies can be generated, for example, by ringtone generator 130 and sent to the audio I/O 145 for output. The plurality of frequencies can also be generated by ringtone generator 205A or 225A and sent to the wireless device for output by the audio I/O 145.

In operation 410, the frequency which the user perceives as the loudest frequency or frequencies from among the plurality of frequencies is determined. For example, when the plurality of frequencies is output by the audio I/O 145, the wireless device can be configured to accept an input at the user interface 135 or an input-enabled display 115 indicating the frequency or frequencies perceived to be the loudest. In operation, the plurality of frequencies are output by the audio I/O 145 at substantially the same sound pressure level (SPL) to increase the accuracy of the determination of the loudest perceived frequency.

In operation 415, a first frequency range is determined comprising a first minimum frequency and a first maximum frequency. For example, the first minimum and maximum frequencies can be determined based on a predetermined frequency interval, for example 500 Hz, so that the first minimum frequency will be determined to be 250 Hz lower than a determined loudest frequency, and the first maximum frequency will be determined to be 250 Hz higher than a determined loudest frequency. As another example, the first minimum and maximum frequencies can be selected by a user. For example, when the loudest frequency is determined to be 3000 Hz, the first minimum frequency of the first frequency range can be determined by providing frequencies increasingly lower than 3000 Hz, and receiving an input indicating when the perceived loudness of the frequencies meets or is below a threshold. The threshold can be a perceptual threshold indicated by the user, for example, when the frequencies can no longer be heard, or at a point where a user indicates a frequency at a perceived loudness less than that of the determined loudest frequency, but still audible to the user. Similarly, the first maximum frequency can be determined by providing frequencies increasingly lower than 3000 Hz (the perceived loudest frequency in this example) and receiving an input indicating that a perceived volume meets or is below a threshold, as described above.

In operation 420, a ringtone is received at the wireless device. This can be the selection of a ringtone from the memory 125 of the wireless device. It can also be the input of a ringtone at the wireless device, or the receiving of a ringtone from a network element such as computing node 225, or from a computing device such as a computing device 205. The ringtone has a second frequency range, that is, the constituent frequency or frequencies of the ringtone fall on or within a second minimum and second maximum frequency. The second frequency range may partially overlap with the first frequency range, but at least a portion of the second frequency range does not overlap with the first frequency range. When the ringtone is received at the wireless device, it may be provided to the ringtone generator 130. In other embodiments, the ringtone may be provided to the ringtone generator 205A of the computing device 205, or to the ringtone generator 225A of the computing node 225.

In operation 425, the ringtone is processed to shift the second frequency range into the first frequency range. The ringtone generator 130 (or ringtone generator 205A or 225A) processes the second ringtone to shift the second frequency range to within the first frequency range, wherein an average frequency of the processed ringtone is the determined loudest frequency. As an example, the ringtone generator 130 can analyze the ringtone and determine its constituent frequencies. As another example, the ringtone can comprise metadata which indicate the ringtone's constituent frequencies and/or its frequency range. Based on the identified constituent frequencies of the ringtone and the determined first frequency range, the ringtone generator shifts the ringtone frequencies into the first frequency range. In an embodiment, the ringtone generator 130 can be configured to shift the frequencies proportionally to preserve a relationship among the ringtone frequencies.

In operation the processed ringtone is stored in memory 125 of the wireless device and can be used as an audio signal by the wireless device, for example, to draw a user's attention to an incoming phone call, a received message, or a calendar event notification, among other things.

Figure 5:
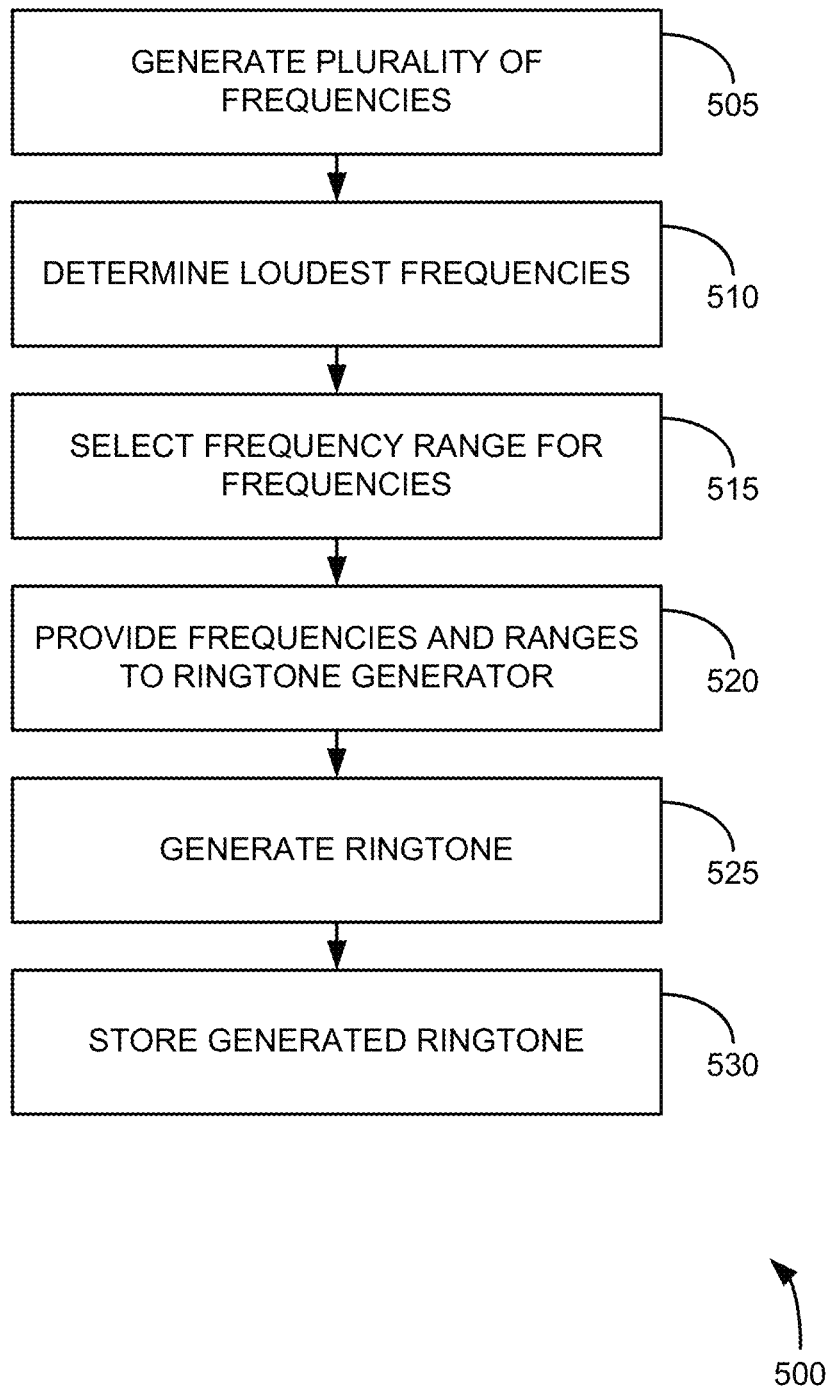
FIG. 5 illustrates another exemplary method of generating a ringtone.

FIG. 5 illustrates another exemplary method of generating a ringtone. In operation 505, a plurality of frequencies is generated and provided to a user at the wireless device. The plurality of frequencies can be generated, for example, by ringtone generator 130 and sent to the audio I/O 145 for output. The plurality of frequencies can also be generated by ringtone generator 205A or 225A and sent to the wireless device for output by the audio I/O 145.

In operation 510, a set of frequencies which the user perceives as the loudest frequencies from among the plurality of frequencies is determined. For example, when the plurality of frequencies is output by the audio I/O 145, the wireless device can be configured to accept an input at the user interface 135 or an input-enabled display 115 indicating the frequency or frequencies perceived to be the loudest. In operation, the plurality of frequencies are output by the audio I/O 145 at substantially the same SPL to increase the accuracy of the determination of the loudest perceived frequency. The set of frequencies need not be adjacent frequencies, and can be discrete frequencies separated by a gap in the plurality of frequencies.

In operation 515, a frequency range comprising a first minimum frequency and a first maximum frequency and associated with each of the determined frequencies is determined. For example, the first minimum and maximum frequencies can be determined based on a predetermined frequency interval, for example 500 Hz, so that the first minimum frequency will be determined to be 250 Hz lower than a determined loudest frequency, and the first maximum frequency will be determined to be 250 Hz higher than a determined loudest frequency. As another example, the first minimum and maximum frequencies can be selected by a user, either by inputting the frequencies or by inputting an indication that frequencies which meet a threshold.

In operation 520, the set of frequencies and associated frequency ranges is provided to the ringtone generator 130 (or 205A or 225A). Using the set of frequencies and the associated frequency ranges, the ringtone generator generates a ringtone. In the generation of the ringtone, the ringtone generator can be configured to select primarily the perceived loudest frequencies, and can include frequencies from the associated frequency ranges. The resulting ringtone can be a set of frequencies, for example a set of musical notes, or it can be a more complex multitimbral sound such as an analog telephone bell sound, comprising frequencies from among the set of frequencies and the associated set of frequencies.

In operation 530, the generated ringtone is stored in memory 125 of the wireless device. In the case where the ringtone is generated by ringtone generator 205A or 225A, the generated ringtone is sent to the wireless device and then stored in memory 125.

Figure 6:
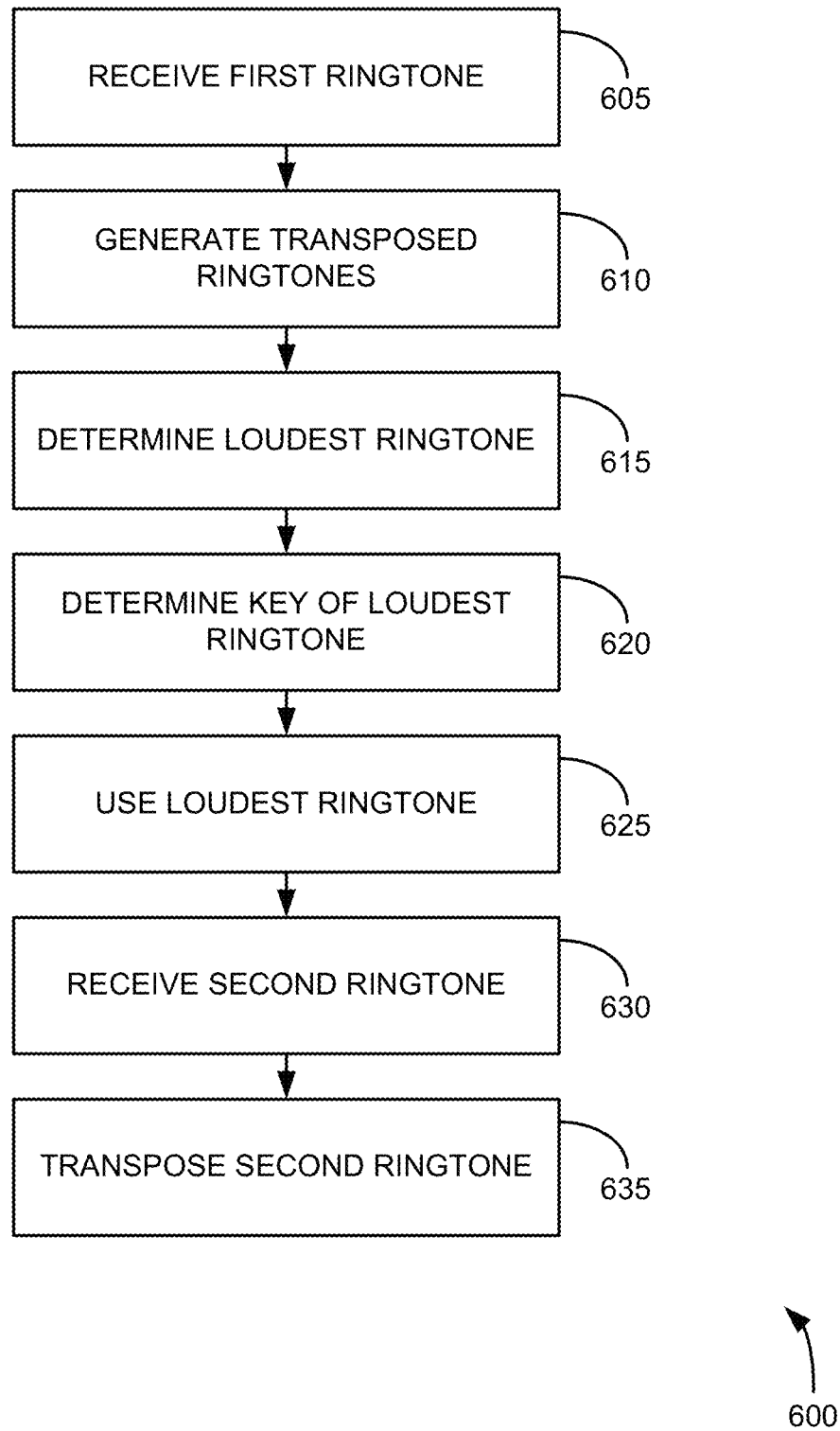
FIG. 6 illustrates another exemplary method of generating a ringtone.

FIG. 6 illustrates another exemplary method of generating a ringtone. In operation 605, a ringtone is received at the wireless device. This can be the selection of a ringtone from the memory 125 of the wireless device. It can also be the input of a ringtone at the wireless device, or the receiving of a ringtone from a network element such as computing node 225, or from a computing device such as computing device 205. The received ringtone is in a first musical key which can be determined by the ringtone generator 130. A musical key (or hereinafter simply a "key") in the Western diatonic system (i.e., the tuning and scale system generally originating in the western European classical music tradition) is a set of known frequency ratios and relationships. By analyzing the constituent frequencies of the received ringtone, the key of the ringtone can be determined by the ringtone generator. Naturally the ringtone generator is not limited to analysis and frequency generation in a diatonic system, and can be configured for any tuning system or system of musical analysis, but for clarity the ringtone generator is discussed herein as using a diatonic framework.

In operation 610, the ringtone generator generates a plurality of transposed ringtones (i.e., transposed to a key different than the key of the received ringtone) using the frequency relationships of the diatonic system and the determined key of the received ringtone. The received ringtone and the transposed ringtones are then sent from the ringtone generator 130 (or ringtone generator 205A, or 225A) to the audio I/O 145 and output for a user. In operation 620, the ringtone which the user perceives as the loudest from among the received ringtone and the plurality of transposed ringtones is determined. For example, the ringtones can be output in a sequence, and when the ringtones are output by the audio I/O 145 the wireless device can be configured to accept an input at the user interface 135 or an input-enabled display 115 indicating the ringtone perceived to be the loudest. In operation, the ringtones are output by the audio I/O 145 at substantially the same SPL to increase the accuracy of the determination of the loudest perceived ringtone. When the perceived loudest ringtone has been determined, that ringtone and its key are stored in memory 125.

In operation 630, a second ringtone is received at the wireless device, similar to the receiving of the first ringtone, described above, and the musical key of the second ringtone is determined by the ringtone generator 130 (or 205A, or 225A), for example, by analyzing the ringtone and determining its constituent frequencies, or by processing metadata associated with the second ringtone which indicates the key of the second ringtone. Using the musical key of the determined loudest ringtone and the frequency relationships of the diatonic system, the ringtone generator transposes the second ringtone into the key of the determined loudest ringtone. The transposed second ringtone can be saved in memory 125 for current or later use.

Some or all of the actions performed by the exemplary embodiments described herein can be performed under the control of a computer system executing computer-readable codes stored on a computer-readable recording medium or transmitted via a communication signal. The computer-readable recording medium is any data storage device that can store data for a non-fleeting period of time such that it can thereafter be read by a computer system. Examples of the computer-readable recording medium include, but are not limited to, read-only memory (ROM), random-access memory (RAM), magnetic tapes, floppy disks, optical data storage and solid state storage devices. The computer-readable recording medium can also be distributed over network-coupled computer systems so that the computer-readable code is stored and executed in a distributed fashion. The transmitted communication signals are expressly distinguished from the computer-readable codes and from the computer-readable recording medium, and may include, for example, signals which modulate carrier waves transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:
1. A method of generating a ringtone, comprising:
generating a plurality of frequencies and providing the plurality of frequencies for a user at a wireless device, wherein each of the plurality of frequencies is provided within a threshold amount of a uniform sound pressure level;
determining a minimum sound pressure level audible by the user at each of the plurality of frequencies, and determining a frequency corresponding with the lowest minimum audible sound pressure level;
determining a frequency which the user perceives as the loudest frequency from among the plurality of frequencies based on an input received at the wireless device;
selecting based on the determined frequency a first frequency range comprising a first minimum frequency and a first maximum frequency;
receiving at the wireless device a ringtone in a second frequency range, wherein the second frequency range comprises a second minimum frequency and a second maximum frequency;
processing the received ringtone at a network computing node to shift the second frequency range of the received ringtone within the first frequency range, wherein an average frequency of the processed ringtone is the determined loudest frequency, and further wherein the second minimum frequency is shifted to be greater than or equal to the first minimum frequency and the second maxi- mum frequency is shifted to be less than or equal to the first maximum frequency; and sending the processed ringtone with the average frequency being the determined loudest frequency to the wireless device.

2. A method of generating a ringtone, comprising:

generating a plurality of frequencies at a wireless device;

determining a plurality of frequencies which a user perceives as the loudest frequencies at substantially the same sound pressure level from among the plurality of frequencies;

selecting for each of the determined frequencies a frequency range comprising a minimum frequency and a maximum frequency;

providing the determined frequencies and selected frequency ranges to a ringtone generator in a network computing node;

generating at the ringtone generator a ringtone comprising a plurality of frequencies from within the selected frequency ranges of each of the determined frequencies; and sending the generated ringtone with the selected frequency ranges to the wireless device.

3. A method of generating a ringtone, comprising:

receiving at a wireless device a selected first ringtone in a first musical key;

generating a plurality of transposed ringtones in a plurality of transposed musical keys which are different than the first musical key, wherein the transposed musical keys and the first musical key are generated at substantially the same sound pressure level;

determining a ringtone which a user perceives as the loudest ringtone from among the first ringtone in the first musical key and the transposed ringtones in the transposed musical keys;

determining the musical key of the determined loudest ringtone;

receiving at the wireless device a second ringtone in a second musical key; and automatically transposing the second ringtone to the determined musical key while preserving relationships among ringtone frequencies of the second ringtone.

4. The method of claim 3, wherein the relationships among ringtone frequencies comprise relative frequency ratios between musical tones.

5. The method of claim 3, wherein the transposing of the second ringtone occurs at a network computing node.

6. The method of claim 3, wherein the generating of the plurality of transposed ringtones occurs at a network computing node.

7. The method of claim 1, wherein the generated plurality of frequencies further comprises musical tones having relationships among the musical tones that determine a musical key of the plurality of frequencies.

8. The method of claim 7, wherein the received ringtone is in a first musical key and the processed ringtone is in a second musical key that preserves the relationships among the musical tones of the first musical key.

* * * * *